United States Patent

Poch-Parramon et al.

[11] Patent Number: 6,096,819
[45] Date of Patent: Aug. 1, 2000

[54] REFLECTOR BLANK AND METHOD AND MEANS OF PRODUCING THE SAME

[75] Inventors: Jose Poch-Parramon; Roland Glagla, both of Iserlohn, Germany

[73] Assignee: Bakelite AG, Germany

[21] Appl. No.: 09/077,699

[22] PCT Filed: Sep. 24, 1997

[86] PCT No.: PCT/EP97/05249

§ 371 Date: May 27, 1998

§ 102(e) Date: May 27, 1998

[87] PCT Pub. No.: WO98/15774

PCT Pub. Date: Apr. 16, 1998

[30] Foreign Application Priority Data

Oct. 7, 1996 [DE] Germany .................. 194 41 162

[51] Int. Cl.$^7$ ....................................... C08K 3/00
[52] U.S. Cl. .................. 524/420; 524/423; 524/425; 524/447; 524/451; 524/496
[58] Field of Search .................... 524/420, 423, 524/425, 447, 451, 496

[56] References Cited

FOREIGN PATENT DOCUMENTS

| | | |
|---|---|---|
| 4404604 | 8/1995 | Germany . |
| 4441486 | 5/1996 | Germany . |
| 1250805 | 10/1971 | United Kingdom . |

OTHER PUBLICATIONS

Chemical Abstracts, vol. 99, No. 4, Jul. 25, 1983, Abstract No. 23550, XP002054338.
Chemical Abstracts, vol. 105, No. 8, Aug. 25, 1986, Abstract No. 61763, XP002054339.
Chemical Abstracts, vol. 94, No. 6, Feb. 9, 1981, Abstract No. 31581, XP002054340.

*Primary Examiner*—Edward J. Cain
*Attorney, Agent, or Firm*—Bierman, Muserlian and Lucas

[57] ABSTRACT

The invention concerns reflector blanks which are produced from a plastics material and to whose surface parts which are adapted to reflect beams a layer of metal is applied. The reflector blanks according to the invention are produced by injection-moulding or transfer-moulding a moulding compound based on duroplastic polymer which is hardened by condensation reaction, preferably phenol novolak.

6 Claims, No Drawings

REFLECTOR BLANK AND METHOD AND MEANS OF PRODUCING THE SAME

This application is a 371 of PCT/EP97/05249 filed Sep. 24, 1997.

The present invention relates to reflector blanks comprising a synthetic material, on whose surface portions, intended for the reflection of beams, a coating of metal is applied. It is within the scope of prior art (cf. Duroplaste, Kunststoff-Handbuch, Vol. 10, Hanser-Verlag, Second Edition, 1988, pp. 318–319) to produce the blanks, i.e. the nonmetallized reflectors through injection molding or transfer molding of BMC molding compounds. BMC molding compounds are plastic compounds of unsaturated polyester resin dissolved in styrene, curing agents, additives and reinforcement fibers.

However, the obtained blanks have insufficient surface quality. The surfaces have peak-to-valley heights of 0.2 to 0.5 $\mu$m. They are therefore improved through additional lacquer/varnish treatment before the metal coating is applied. This permits attaining peak-to-valley heights of <1 $\mu$M (cf. DE-C 41 12 144).

Since the lacquer/varnish treatment of the blanks is an undesirable process step, attempts are made, to produce blanks with improved surface quality which can be metallized directly.

It is known for example from EP-A 0 634 605 to produce reflectors with high surface quality by injection molding of an epoxy resin molding compound which comprises as preferred fillers a quartz/kaolin mixture and wollastonite. Apart from the fact that, due to the hard filler materials, these molding compounds lead to increased tool and machine wear our own work showed that such molding compounds show a shrinkage of approximately 0.7 to 1% during the curing. In addition, a surface peak-to-valley height of only 0.1 $\mu$m is obtained.

It is therefore the task of the invention to describe a reflector blank in which the application of the metal coating on the synthetic material blank (metallization) can take place without intermediate surface improvement, in which the blank during the curing experiences markedly decreased shrinkage and attains a surface peak-to-valley.

U.S. Pat. No. 5,760,159 teaches one to produce reflector blanks meeting the above listed requirements of polyester molding compounds free of styrene and fibers.

It was found that molding compounds based on thermosetting polymers which are cured by condensation reactions are also suitable for the production of reflector blanks if they are free of fibers and if the filler substances have a mean particle size of less than 50 $\mu$m, preferably less than 10 $\mu$m. It is therein especially surprising that the compounds, although cured by condensation reaction, have a surface peak-to-valley height of less than 0.1 $\mu$m and only a low shrinkage of less than 0.7%, while the epoxy resin molding compounds, known from EP-A 0 634 605 and curing by addition reaction, have greater surface peak-to-valley heights and stronger shrinkage.

The reflector blanks according to the invention are therefore accurate to dimensional measurements, have sufficient strengths and a surface peak-to-valley height of less than 0.1 $\mu$m.

The molding compounds used for the production of these reflector blanks comprise one of more duroplastic resin(s), curing by condensation reaction, fillers and additives, as well as potentially curing agents or curing accelerators.

It was found that such molding compounds, after they have been molded and cured, show an extremely low degree of shrinkage of approximately <0.3 to 0.6% and high surface quality with peak-to-valley heights of <0.1 to <0.05 $\mu$m if the fraction of fillers is at least 45 wt % and the fillers have a mean grain size of less than 50 $\mu$m, preferably of less than 10 $\mu$m. These molding compounds are formed in a manner known per se through injection molding or transfer molding processes and cured, and in the process blanks are produced with an average surface peak-to-valley height of less than 0.5 $\mu$m, even of less than 0.1 $\mu$m. The application of a metal coating on the surface which is intended to be reflective, takes place in a manner known per se such as is also used in reflectorizing processes according to the described prior art, however, without intermediate lacquer/varnish treatment of the blank, for example by direct vapor deposition of aluminum onto the blank.

Bonding agents in the molding compounds used according to the invention are thermosetting polymers, which are cured by condensation reaction, such as for example aminoplasts, in particular melamine or urea resins, furan or phenolic resins or resin mixtures. The condensation resins used preferably are modified and unmodified phenolic resins and specifically acid catalyzed as well as also alkaline catalyzed condensation products of phenolic compounds, in particular of phenol or alkyl phenols with aldehydes, in particular with formaldehyde, and it is additionally also possible during or after the production to condense in furfuryl alcohol, melamine and/or urea. The most preferred resin is phenol novolak.

The molding compounds according to the invention can furthermore comprise up to 15 wt % of a thermoplastic material such as for example aliphatic or aromatic hydrocarbon resins, polyethylene, polypropylene, polyvinyl alcohol or polyvinyl acetate powder.

Further components are filler substances as well as conventional curing agents and/or curing accelerators as well as mold-release and lubricants..

Fillers used according to the invention are not fibers, respectively fiber or needle-like substances, but grainy or amorphous fillers. Examples are chalks, preferably precipitated or amorphous chalks, aluminum hydroxide, kaolin, carbon black, zinc sulfide, barium sulfate, dolomite, titanium dioxide or talcum provided they have a mean particle size of less than 50 $\mu$m, preferably of less than 10 $\mu$m.

Some of the thermosetting condensation polymers, such as urea resins or resols condensed in an alkaline environment, are so-called self-curing products which only require thermal energy for their curing.

Curing agents and/or curing accelerators, as far as they are required, are products known per se and conventionally used for these duroplastic resins, such as for example acidic or acid-splitting compounds as curing accelerators for aminoplasts or as latent or non-latent curing agents for furan resins. In contrast, novolaks are preferably cured with hexamethylene tetramine. For curing the novolaks, however, other products, known per se, such as for example resols or epoxy resins can also be used.

Further process materials are mold-release and lubricating agents such as metal soaps or waxes. For the molding compounds according to the invention thus the following general structure results:

| | |
|---|---|
| Thermosetting polymer(s) | 25–45 wt % |
| Thermoplast | 0–15 wt % |
| Filler materials | 45–75 wt % |
| Curing agent, respectively curing accelerator | 0–10 wt % |
| Mold-release and lubricating agents | 0.5–2 wt % |

Fabrication of the molding compounds takes place in a manner known per se by mixing the components.

The free-flowing compounds are plastified, formed and cured at temperatures in a manner the range of 140 to 200° C. within 50 to 120 seconds in known per se and in conventionally used injection molding or transfer molding devices.

The shrinkage occurring during the curing is approximately <0.3–0.6 % and thus permits production of even complicated structures which are highly accurate to dimensional measurements. The flexural strengths of the cured compounds, tested according to ISO 178, are in the range of 100 to 120 MPa. The impact resistance tested according to ISO 179/1 eU, is in the range of 6–8 kJ/m$^2$, and the notch-impact strength, tested according to ISO 179//1 eU, is 1–2 kJ/m$^2$.

What is claimed is:

1. A molded reflective blank having an average peak to valley height of less than 0.1 μm capable of being metallized without intermediate coating made of a thermosetting polymer which is cured by a condensation reaction free of fibers or fiber-like substances and containing fillers with a mean particle size of less than 50 μm.

2. A reflective blank of claim 1 wherein the thermosetting resin is a phenolic resin.

3. A reflector blank of claim 1 wherein the thermosetting polymer contains up to 15% by weight of a thermoplastic material.

4. A reflector blank of claim 3 wherein the thermoplastic material is selected from the group consisting of aliphatic hydrocarbon resins, aromatic hydrocarbon resins, polyethylene, polypropylene, polyvinyl alcohol and polyvinyl acetate powder.

5. A reflector blank of claim 1 wherein the blank is comprised of 24 to 45% by weight of a thermosetting polymer, 0 to 15% by weight of a thermoplastic material, 45 to 74% by weight of fillers, 0 to 17% by weight of curing agent and 0.5 to 2% by weight of lubricant.

6. A reflector formed by direct vapor deposition of aluminum on a reflector blank of claim 1.

* * * * *